L. W. WHIPPLE.
Horseshoe-Nail Machine.

No. 228,792. Patented June 15, 1880.

Fig. 1.

Witnesses.
Geo. Willis Pierce.
R. Johnson

Inventor.
Lyman W. Whipple
by Wright & Brown
Attys.

L. W. WHIPPLE.
Horseshoe-Nail Machine.

No. 228,792.   Patented June 15, 1880.

Witnesses.   Inventor.

L. W. WHIPPLE.
Horseshoe-Nail Machine.

No. 228,792. Patented June 15, 1880.

Witnesses.
Geo. Willis Pierce.
R. Johnson

Inventor.
Lyman W. Whipple
by Wright Brown
Attys.

L. W. WHIPPLE.
Horseshoe-Nail Machine.

No. 228,792. Patented June 15, 1880.

Witnesses.
Geo. Willis Pierce.
R. Johnson.

Inventor.
Lyman W. Whipple
by Wright & Brown
Attys.

N. PETERS, PHOTO-LITHOGRAPHER, WASHINGTON, D. C.

L. W. WHIPPLE.
Horseshoe-Nail Machine.

No. 228,792. Patented June 15, 1880.

UNITED STATES PATENT OFFICE.

LYMAN W. WHIPPLE, OF BOSTON, MASSACHUSETTS, ASSIGNOR, BY MESNE ASSIGNMENTS, TO THE UNITED STATES HORSE NAIL COMPANY, OF HARTFORD, CONNECTICUT.

HORSESHOE-NAIL MACHINE.

SPECIFICATION forming part of Letters Patent No. 228,792, dated June 15, 1880.

Application filed September 24, 1879.

*To all whom it may concern:*

Be it known that I, LYMAN W. WHIPPLE, of Boston, in the county of Suffolk and State of Massachusetts, have invented certain Improvements in Horseshoe-Nail Machines, of which the following is a specification.

This invention has for its object to provide an automatic machine adapted to rapidly form a cold-rolled horseshoe-nail from a strip or plate by successive punching and rolling operations without releasing the nail-blank or allowing it to change its position by gravitation or accident, thereby insuring the proper position of the blank with reference to the mechanism which imparts to it its successive changes of form.

The invention also has for its object to provide an automatic machine whereby two or more nail-blanks can be punched simultaneously from a single plate in close proximity to each other and formed simultaneously by successive operations without being released.

To these ends the invention consists, first, in the combination of a series of automatic devices, consisting of punching mechanism and rolls or formers, operating to separate a blank from a strip or plate and impart successive changes of form thereto, a series of intermediate forwarders arranged between said devices, and mechanism whereby the forwarders are held to receive blanks and moved to present the same properly to the succeeding devices.

The invention consists, secondly, in the combination of a gang of punches operating to simultaneously separate two blanks in close proximity to each other from a single strip, two formers or two series of formers operating to simultaneously form a like number of nail-blanks, and two distributing-forwarders adapted to receive the blanks from the punches and distribute the same to the formers.

The invention also consists in various sub-combinations and minor improvements relating to an automatic machine for forming horseshoe-nails, all of which I will now proceed to describe and claim.

Of the accompanying drawings, forming a part of this specification, Fig. 3 represents a top view. Fig. 4 represents a section on line $x\, x$, Fig. 2, looking downwardly. Fig. 5 represents a section on line $y\, y$, Fig. 2, looking upwardly. Fig. 6 represents a section on line $z\, z$, Fig. 2. Fig. 7 represents a section. Figs. $3^a$, 8, 9, 10, $10^a$, $10^b$, 11, 12, 13, 14, 15, 16, and 17 represent views of parts in detail.

Similar letters of reference indicate like parts in all the figures of the drawings.

In the drawings, A represents the general frame-work, of suitable construction to support the parts hereinafter described. At or near the front of the frame is a gang of punches, B B', two in number in the present case, although more may be used if desired. These punches are attached to a cross-head, C, which is reciprocated vertically in guides in the frame A by eccentrics D D on a continuously-rotating shaft, E, said eccentrics being connected to the cross-head C by rods F F. The punches B B' are formed to cut or separate blanks $B^2$, approximating the shape of a horseshoe-nail, from a nail strip or plate, and said punches co-operate with corresponding female dies G G' in a stationary block, H, the punches forcing the blanks downwardly through said dies, which are kept filled with the blanks, and are provided with suitable springs $a^3$, whereby the accumulated blanks are prevented from dropping or falling from the dies by their own weight, said springs bearing against the ends of the blanks with a yielding pressure.

Figure 17:
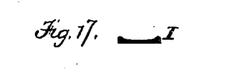

The punches B B' (when two are employed) are arranged so that of the blanks cut at one descent the head of one will be adjacent to the point of the other. This arrangement is made to enable a nail strip or plate, I, having the form in cross-section shown in Fig. 17, to be cut without waste; but this arrangement of punches and form of the plate I are not parts of my present invention.

The plate I is presented to the punches by an automatic feeding device composed of a reciprocating bed, J, and a shoe, J', pivoted at K to ears on the bed, and adapted to swing vertically, the plate being inserted between the bed and shoe. The bed J reciprocates in guides attached to the frame A, and moves alternately toward and from the punches. This movement of the bed J is effected by a cam, L, on the shaft, and a lever, M, pivoted at N to the frame A, and at O to the bed J, and held by a spring, P, in contact with the surface of the cam. An adjustable screw or screws, Q, on the bed J abuts against a shoulder, R, on the frame A, and limits the approach of the bed to the punches, and therefore the length of the feed.

S represents a cam journaled in blocks supported on the bed J, and operated to intermittingly depress the shoe J' by a crank, T, a connecting-rod, U, and a cam-groove, V, in a disk on the shaft E.

The movements of the bed and shoe are so timed with relation to the movements of the punches that the shoe is pressed downward, and the bed and shoe are moved forward, while the punches are raised, thereby moving the plate forward. When the feeding is accomplished the bed and shoe remain stationary, griping the plate until the punches commence to enter the plate. The shoe is then released by the cam S, and the bed and shoe let go their hold on the plate and move backwardly while the plate is transfixed by the punch.

It will be seen that as the cam S, which presses the shoe upon the plate, is supported entirely by the bed itself, the pressure exerted upon the plate does not increase the pressure of the bed J upon its guides; hence said bed is moved forward as easily as backward, and the length of its movement is not liable to be affected by variations of pressure upon it.

$a\ a$ represent a pair of rolls, which constitute what I term a "former," each roll having a cavity, $b$, cut in its periphery, said cavities coinciding and constituting dies to form and move forward a nail-blank. There may be any desired number of these formers arranged in a series, each adapted to impart a different form to a nail-blank, and there should be as many of such series as there are punches in the gang. In the present instance, there being two punches in the gang, there are two series of formers, (one series being marked 1 1 and the other 2 2 in the drawings,) and each series is composed of two formers—that is to say, two pairs of rolls, $a\ a$, adapted to impart successive changes of form to a blank.

Figures 7, 14, 15, 16:
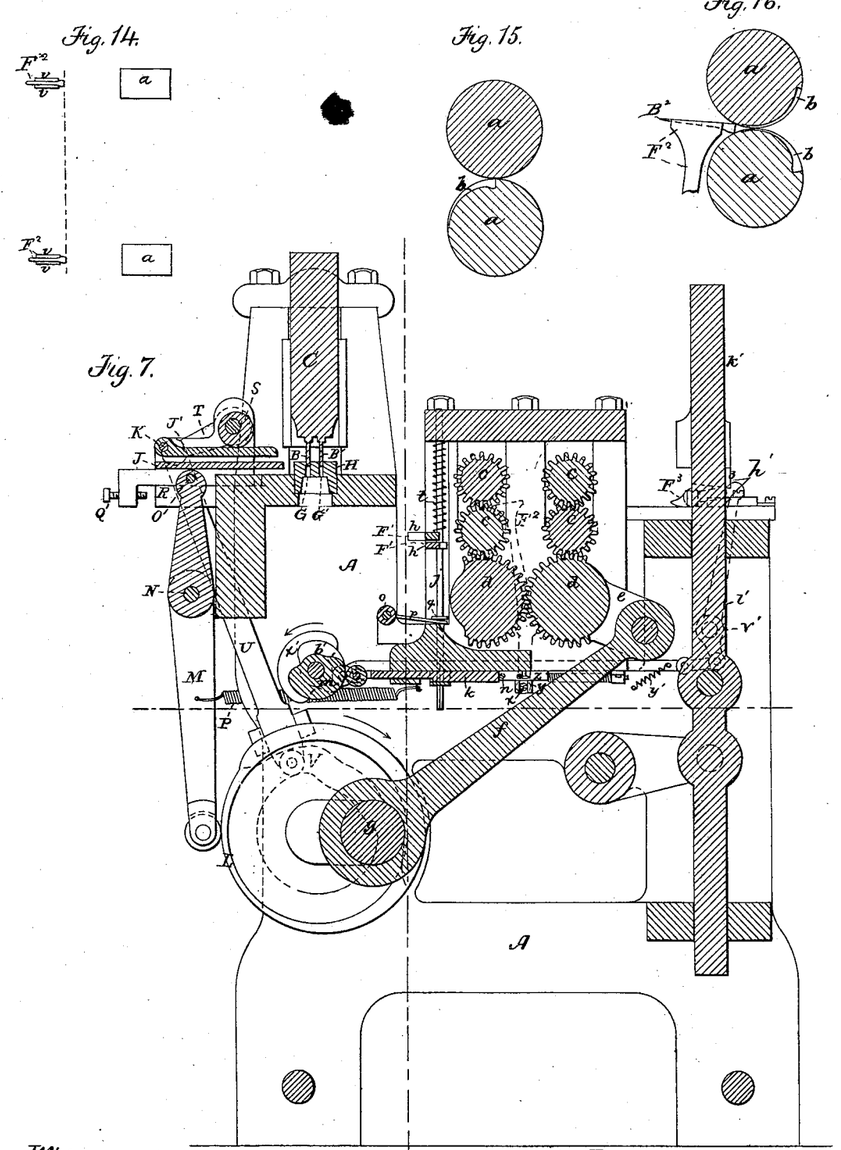

The rolls $a$ are rigidly attached to the opposite ends of shafts $c\ c$, which are journaled in the frame A, the shafts being arranged in two pairs, as shown in Fig. 7. The rolls $a$ project outside of the frame A, so that they are fully exposed to observation. The shafts of each pair are connected by cogs formed on said shafts, so that they rotate simultaneously, and the lower shafts of the two pairs mesh with two cog-wheels or sectors, $d\ d$, which mesh with each other. One of the sectors $d$ is provided with a crank, $e$, which is connected by a rod, $f$, with a crank, $g$, on the driving-shaft E.

It will be seen that the rotation of the shaft E produces a simultaneous oscillation or vibration of the two trains of gearing consisting of the sectors $d\ d$ and the pairs of shafts; hence the rolls on said shafts are vibrated, the rolls of each pair vibrating in opposite directions to the corresponding rolls of the other pair.

The rolls $a\ a$, $a\ a$ on each pair of shafts I term a "gang of formers," and the two pairs in each gang are constructed to impart substantially the same form simultaneously to two blanks.

F' F' represent what I term "distributing-forwarders," the same consisting of curved and bent arms $h\ h$ and separable spring-jaws $i\ i$, $i\ i$, which are, in fact, inwardly-pressing springs attached in pairs to the arms $h\ h$. Each arm and its jaws constitutes a forwarder, and the forwarders agree in number with the punches.

Figures 5, 6, 11, 12, 13:
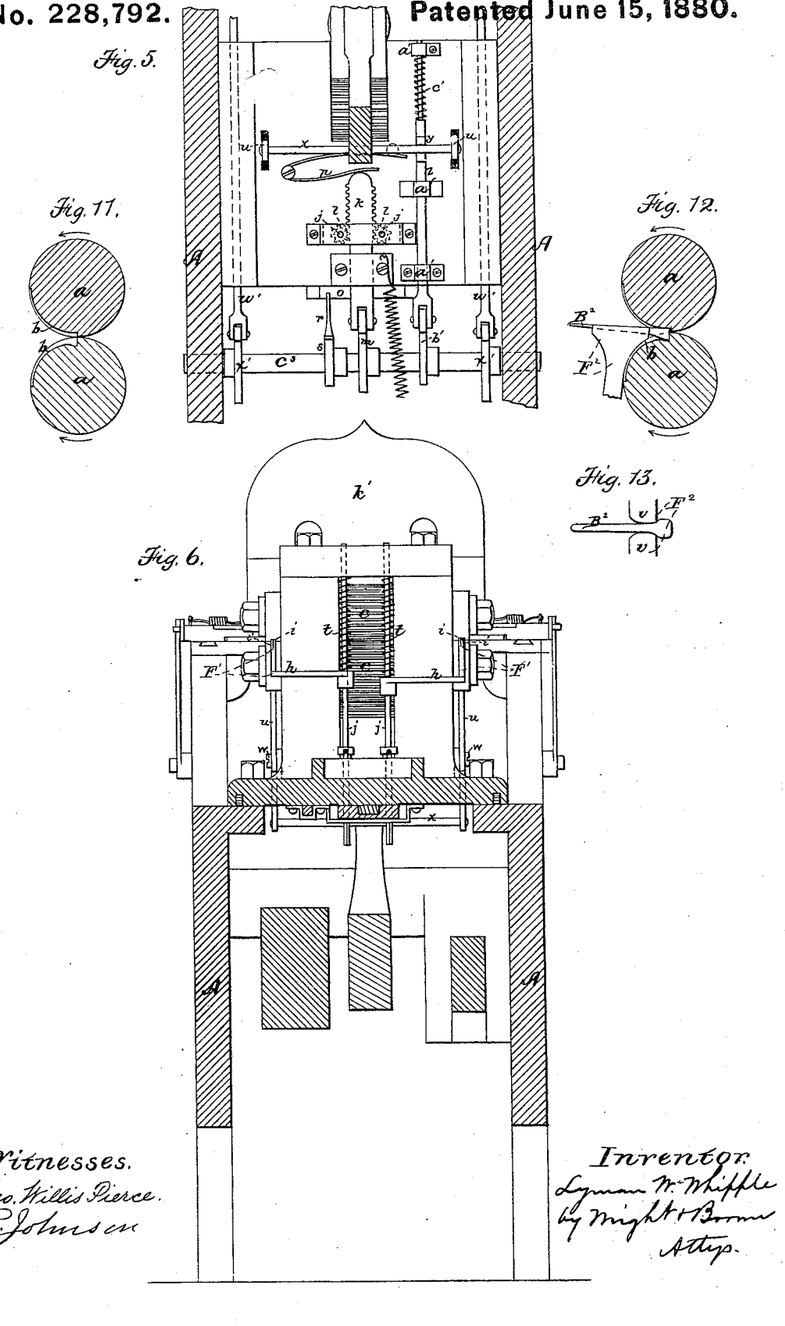

The arms $h\ h$ are located on vertical spindles $j\ j$, which are adapted both to rotate and move vertically in bearings in the frame A. The rotary movement of the spindles $j\ j$ is effected by a reciprocating double rack, $k$, sliding horizontally in guides on the frame A, and engaging simultaneously with pinions $l\ l$ on the lower ends of the spindles $j$, as shown in Fig. 5.

The rack $k$ is reciprocated longitudinally by means of a rotating cam, $m$, which moves the rack in one direction, and a spring, $n$, which forces the rack against the surface of the cam. The reciprocating movement of the rack causes it to rotate the spindles $j\ j$ intermittingly, and to change the direction of their rotation, the result being the simultaneous horizontal reciprocating movements of both of the forwarders $i\ i$.

The vertical movements of the spindles $j\ j$ are effected by means of a rock-shaft, $o$, journaled in fixed bearings in the frame A, and provided with arms $p\ p$, bearing against collars $q$ on the spindles $j\ j$, and an arm, $r$, bearing against a rotating cam, $s$. The rock-shaft is rocked by the rotation of the cam $s$, and caused to intermittingly lift the spindles $j$. Springs $t\ t$ on the spindles press the latter downwardly and keep the arm $r$ of the rock-shaft in contact with the cam $s$.

Figure 1:
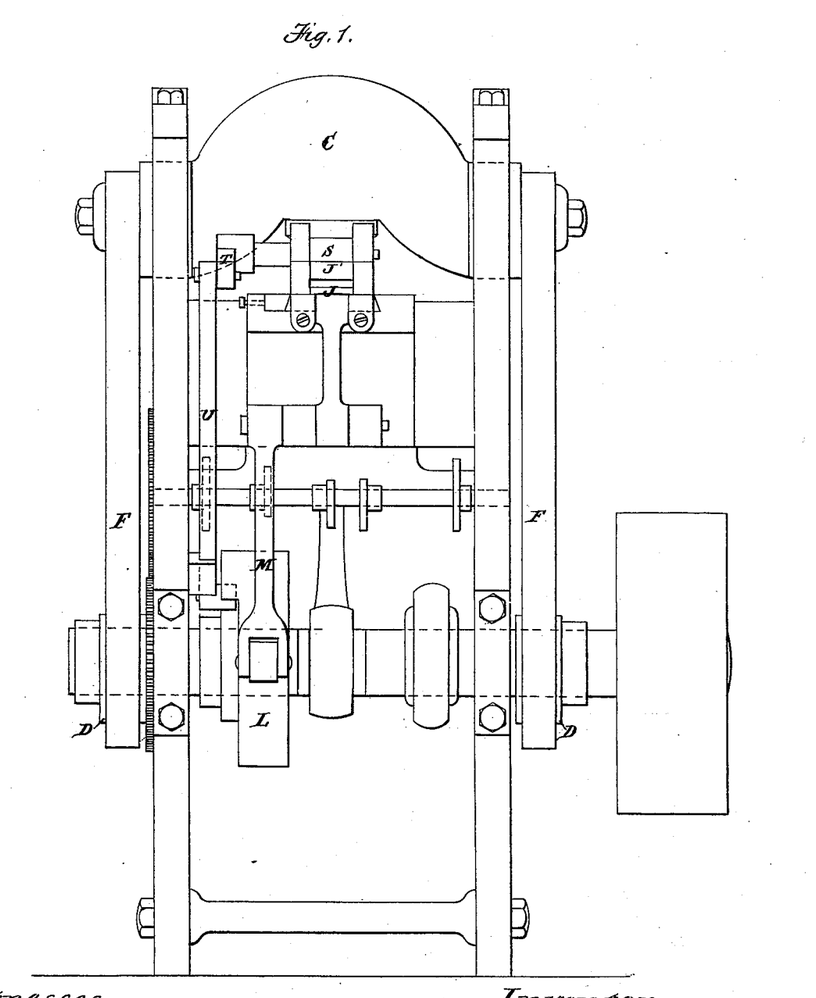
Figure 1 represents a front elevation of a machine embodying my invention.
Figure 2:
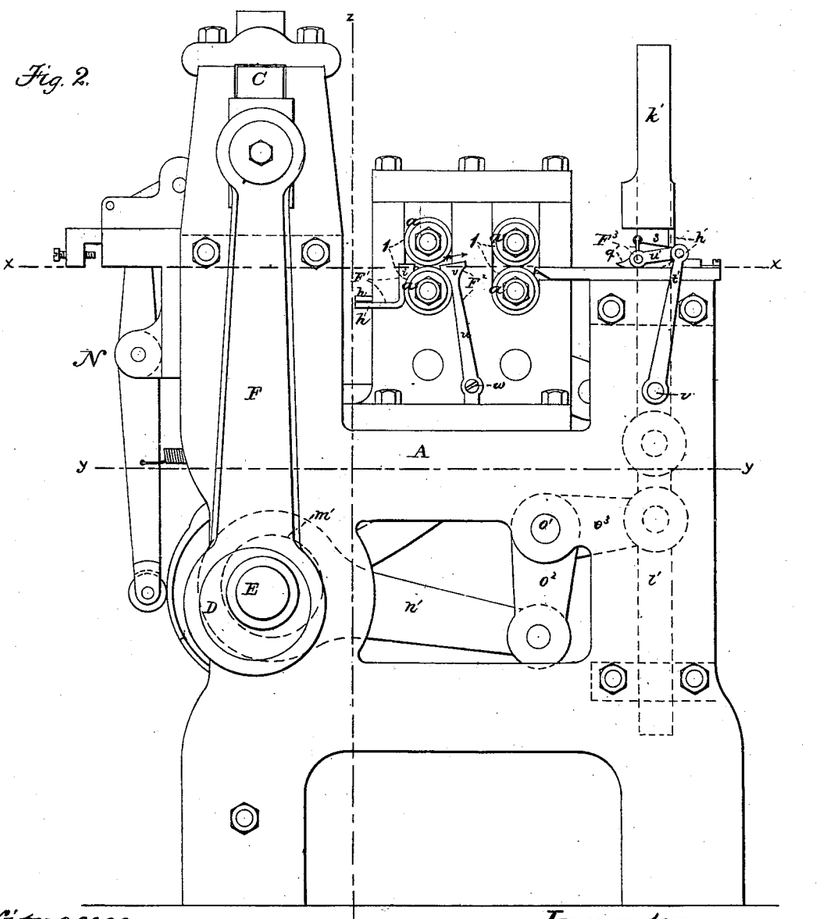
Fig. 2 represents a side elevation of the same.
Figures 3, 3A, 4, 8, 9:
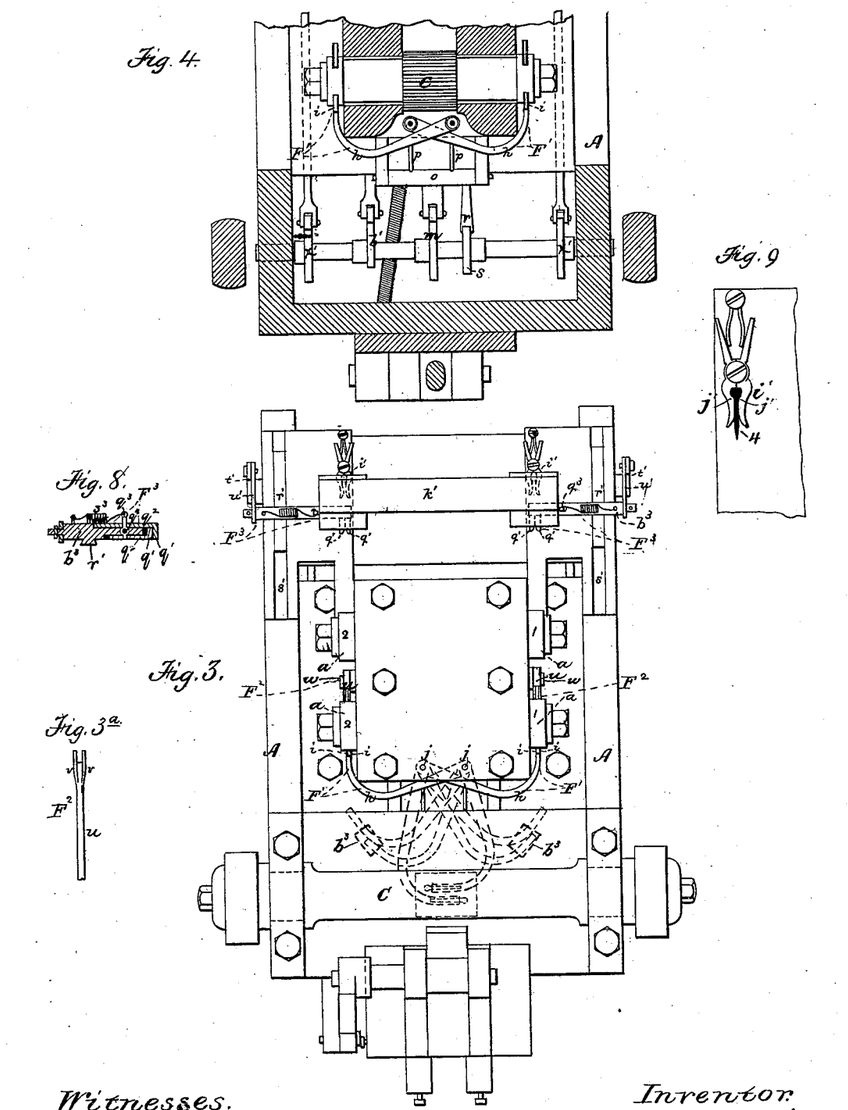

By the described mechanism the forwarders F' F' (supposing said forwarders to be in the positions shown in Figs. 2 and 3) are moved horizontally to points under the dies G G' in the bed H, then raised and caused to enter said dies, then depressed and caused to leave said dies, and finally moved horizontally to the positions shown in Figs. 2 and 3, the forwarders being then in contact with, or in close proximity to, the first gang of rolling formers.

$F^2\ F^2$ represent two reciprocating forwarders, one of which is located between the two formers of each series. These forwarders consist of separable spring-jaws $v\ v$, $v\ v$, supported on the upper ends of levers $u\ u$, which are pivoted to the frame A at $w\ w$, and their lower ends are rigidly connected by a transverse rod, $x$. Said rod is held in a socket, $y$, on a sliding bar, $z$, which is supported in guides $a'$ $a'$ on the frame A, and is reciprocated by a rotating cam, $b'$, and a spring, $c'$, which forces said bar against the surface of said cam. The reciprocating motion of the bar $z$ causes the levers $u$ $u$ to oscillate on their pivots and move the forwarders $F^2$ $F^2$ back and forth between the formers.

The forwarder-jaws $v$ $v$ may be simply inwardly-pressing spring-plates attached to the levers $u$ $u$, as shown in Fig $3^a$; but said forwarders may be constructed like the forwarders $F^3$, hereinafter described.

$h'$ $h'$ represent two clippers or trimming-dies, each consisting of a vertically-reciprocating punch, 3, having the exact outline of a completed nail, and a correspondingly-formed female die, 4, in a bed or block attached to the frame A. Said clippers are adapted to trim and remove the web or fin formed on a nail-blank by the rolling formers.

Over the die 4 of each clipper is located a pair of jaws or nippers, $i'$, which I term "false jaws." These jaws are adapted to open to permit a nail-head to be inserted between them, and are formed with hooks or shoulders $j'$ $j'$, which close against the shank of the nail behind the head after the latter has passed said shoulders.

The false jaws $i'$ hold the nail in the proper position relatively to the punch and die constituting the clipper, and constitute a stop to arrest the forward movement of the nail by its forwarder.

The punches 3 3 are attached to a vertically-reciprocating cross-head, $k'$, which is located on a vertical bar, $l'$, sliding in guides in the frame A, and is reciprocated vertically by a cam, $m'$, on the shaft E, a rod, $n'$, connected to said cam, a rock-shaft, $o'$, journaled in the frame A, and provided with arms $o^2$ $o^3$, connected, respectively, with the rod $n'$ and the bar $l'$.

The rotation of the shaft E rocks the rock-shaft $o'$, and the latter reciprocates the bar $l'$ and its cross-head vertically, the arms $o^3$ of the rock-shaft being so connected to the bar $l'$ that the oscillating motion of the arm will cause a rectilinear motion of the bar.

$F^3$ $F^3$ represent two reciprocating forwarders, which are located between the last formers and the clippers. Each of said forwarders is composed of a pair of separable spring-jaws, $q'$ $q'$, attached to a suitable reciprocating support and adapted to move equally like the jaws $v$ $v$.

Fig. 8 shows a vertical section of one of the forwarders $F^3$, in which the jaws $q'$ $q'$ are formed on plates $q^2$ $q^2$, which slide on a bar, $b^3$. Said plates have openings which receive the ends of a lever, $q^3$, pivoted at $q^4$ to the bar $b^3$, and connected by a spring, $s^3$, to a post on the bar.

The bar $b^3$ is attached to a slide, $r'$, which moves in a groove or guide, $s'$.

This construction causes the jaws to move simultaneously in opposite directions, so that an object introduced between the jaws will move or displace both jaws equally, thereby insuring the proper lateral position of a nail-blank inserted between the jaws with reference to the clippers, hereinafter described, which receive the blanks from the jaws $q'$ $q'$, the central line of the jaws being in line with the central line of said clippers.

The same construction may be employed in the forwarders $F^2$ to insure the proper lateral position of the blank with reference to the nail-forming cavities of the formers.

The forwarders $F^3$ $F^3$ receive blanks from the last gang of formers, and remove the blanks to the false jaws $i'$, the equal movements of the jaws $q'$ $q'$ insuring the proper lateral position of the blanks with reference to the punches and dies of the clippers when the blanks are placed in the false jaws $i'$ $i'$.

The forwarders $F^3$ $F^3$ are reciprocated by means of levers $t'$ $t'$, connected to said forwarders by links $u'$ $u'$, rock-shafts $v'$ $v'$, rods $w'$ $w'$, sliding in guides in the frame A, and rotating cams $x'$ $x'$.

The rods $w'$ $w'$ are pressed by springs $y'$ $y'$ against the surfaces of the cams $x'$ $x'$.

The cams $m$ $s$ $b'$ $x'$ $x'$ are located on a shaft, $c^3$, which is rotated by suitable connections with the shaft E.

The operation of the mechanism described is as follows: The plate I is fed intermittingly, as already described, and two blanks are separated from the plate at each descent of the gang of punches. The blanks, as they are forced downwardly by the punches, accumulate in the dies G G', and are retained in said dies by the springs $a^3$, so that they cannot descend by their own weight. The distributing-forwarders are swung to positions under the dies G G' before the punches perforate the strip, and rise, so that their separable jaws meet the lower ends of said dies while the punches are passing through the plate and forcing the accumulated blanks in the dies downwardly. Hence said jaws meet the lowermost blanks in the dies G G', and each pair of jaws grasps one of said blanks during the downward movement of the latter. The jaws yield or spread when they meet the blanks, and the shanks of the blanks are forced between the jaws, the heads projecting at the ends of the jaws. The blanks are thus grasped with a yielding pressure by the jaws and held with considerable firmness. As soon as the punches have completed their downward movement the distributing-forwarders first descend until the jaws and the blanks contained therein are cleared from the bed, and then moved horizontally until they present the projecting heads of the blanks to the two pairs of rolls $a$ $a$, $a$ $a$, constituting the first gang of formers. The movements of the distributing-formers are simultaneous, and the blank-heads are simultaneously brought in contact with the two formers of the first gang. Said formers reach the limit of their vibration, which brings the head-forming portions of the cavities $b\ b$ together, as shown in Fig. 11, just before the blank-heads reach said formers, so that the head-forming cavities form recesses between the rolls, into which the nail-heads are thrust by the distributing-forwarders, as shown in Fig. 12. As soon as the blank-heads are inserted in said recesses the rolls $a\ a,\ a\ a$ commence their rotation in the proper direction to cause them to grasp the blanks, impart a change of form thereto, and at the same time move them forward out of the distributing-forwarders and in to the forwarders $F^2\ F^2$, which are waiting to receive the blanks as they emerge from the first gang of formers. The forwarders $F^2\ F^2$ are arranged so that as the blanks move forward they will press longitudinally between and displace said forwarders equally in opposite directions. The forwarder-jaws $v\ v$ are of such length that when the blanks are entirely ejected by the first gang of formers the heads of the blanks will have been pushed entirely through said jaws, and the latter will have closed against the sides of the blanks behind the heads, as shown in Fig. 13, holding the blanks firmly. The forwarders $F^2\ F^2$ then move the blanks forward to the second gang of formers, which operate, like the first gang, to grasp and move forward the blanks, give another change of form to said blanks, and force them forward between the jaws of the forwarders $F^3\ F^3$, which are waiting to receive the blanks, and are displaced equally thereby, like the jaws of the forwarders $F^2\ F^2$. The forwarders $F^3\ F^3$ move the blanks forward as soon as they are released by the second gang of formers, and insert the heads of the blanks in the false jaws $i'\ i'$ of the clippers. The blanks are held by the false jaws in such positions relatively to the punches and dies constituting the clippers that when said punches descend they, in connection with the dies, remove the webs or fins formed on the nail-blanks by the secondary formers, the nails thus completed passing out of the machine through the dies.

It will be seen that during the entire operation described the blank is at no time left to itself, but is continuously grasped and held in a predetermined position. The female dies of the punching mechanism, with their springs $a^3$, first hold the blanks after they are separated, and from the dies to the clippers the blanks are alternately grasped by the forwarders and the formers. This continuous positive control of the blanks insures the nearest possible approach to perfect uniformity in the nails produced, and is a very important feature.

The distributing-forwarders, adapted to distribute or separate the blanks from the necessarily close proximity to each other in which they are when first cut from the plate by the punches, enables the blanks to be presented simultaneously to the two series of formers, which cannot be brought so close together as the punches $B\ B'$.

By simultaneously forming two nails in one machine it is obvious a large productive capacity is obtained. The adaptation of the machine to make two nails at once enables a plate to be used which is thicker at one edge than at the other, and can therefore be used for two sizes of nails, the two punches cutting different sizes of nails—for instance, the sizes known as "No. 7" and "No. 8." I have found that by cutting these two sizes from one plate there is less waste in the form of scrap than when the blanks are all of one size. When two sizes are cut by the punches the two series of formers will, of course, differ from each other sufficiently to enable them to form two sizes of nails.

The intermittingly-rotating and rising and falling spindles $j\ j$, operating the forwarders $F'\ F'$, constitute simple and effective means for separating or distributing the blanks to the formers, the relative arrangement of the punching mechanism, distributing-forwarders, spindles, and rolling formers being such that a single partial rotation of the spindles carries the forwarders $F'\ F'$ from points directly under the dies $G\ G'$ to the formers, and vice versa.

I do not limit myself, however, to the employment of the spindles, as the distributing-forwarders may be guided between the dies $G\ G'$ and the formers by suitable curved races or guides.

The upward movement of the forwarders $F'\ F'$ before meeting the dies $G\ G'$ enables the block H to be made comparatively thin, so that the dies will not be deep enough to contain more than about two or three blanks at a time. The blanks accumulated in the dies become inclined at the lower ends of the dies in proportion to the number of blanks, in consequence of the greater thickness of their heads than of their points. Hence the smaller the number accumulated the less will be the inclination of the lower ones, and therefore the more readily will they be inserted into the distributing-forwarders.

The rocking or vibrating motion of the rolls $a\ a$ causes a stoppage or dead-point of the rolls when they are in position to receive the blank, as shown in Fig. 11, and this insures the entrance of the head of the blank between the dies or cavities $b\ b$, and obviates any accident that might occur with continuously-rotating rolls, in case the blank be not presented at the exact moment when the dies are ready to receive it.

The spring $n$, that presses the rack-bar $k$ against the cam $m$, and the spring $c'$, that presses the bar $z$ against its cam, also impart a yielding pressure, respectively, to the forwarders $F'\ F'$ and $F^2\ F^2$, which impels each of said forwarders in the direction of the arrow in Fig. 2. This yielding pressure is productive of the following useful results: First, it prevents a shock or jar when the head of the blank is brought in contact with the dies $b$ $b$, and enables the forwarders F' F' F² F², in case they reach the formers to which they deliver the blanks before said formers are ready to receive them, to press the blank-heads against the peripheries of the rolls $a$ $a$, as shown in Fig. 16, until the opening of the dies, and then impel said heads into the recesses formed by the opening of the dies; secondly, in case a blank passing through the first former in one series has more material in it than the blank at the same time passing through the corresponding former of the other series, and is therefore made longer by its former, and caused to project farther from said former before being released, and is detained by its former longer than the period fixed for the forwarders to move the blanks, the yielding pressure enables the forwarders to wait until the longer blank is released, and at the same time to move forward with the longer blank as fast as the latter is moved by its former, so that there will be no injury inflicted to the forwarders, as there would be if they were positively moved before one of the blanks was released, and the heads of the blanks are kept in alignment—that is to say, the forwarders F² F², which move in unison, grasp the shanks of both blanks at the same distance from the ends of the heads, as shown in Fig. 14, the forward ends of the heads being on a line which is parallel with the axes of the second gang of formers. The heads are thus kept in position to be presented simultaneously to the succeeding formers when the forwarders move forward, and their simultaneous engagement with the succeeding formers is insured. The springs $y'$ impart a similar yielding pressure to the forwarders F³ F³, enabling the same to forward the blanks in alignment to the clippers.

It will be seen that the yielding pressure afforded by the springs $n$, $c'$, and $y'$ does not enable the forwarders F' F² F³ to yield or move from the devices which insert the blanks into the jaws of said forwarders; but the cams $m$, $b'$, and $x'$ $x'$, and the intermediate mechanism described, hold or support the forwarders rigidly while they are receiving the blanks.

Although the machine described and shown has two series of devices adapted to form two nails simultaneously, it is obvious that a single series of devices, consisting of only one of each of the punching, forming, and forwarding devices shown, will embody the very important feature of continuously grasping and progressively moving a nail-blank, and will be, therefore, no departure from the spirit of my invention.

I do not limit myself to any specified number of formers and accompanying forwarders in each series. For some purposes one former—that is to say, a single pair of rolls, $a$ $a$—might be sufficient; but in general two formers are preferable, and sometimes a greater number may be found necessary.

The formers and forwarders may be used to form, grasp, and forward nail and other blanks without the punches or without the clippers, or without either of said devices, other suitable means being provided for supplying blanks to the forwarders and formers, and for disposing of the blanks after they are acted on by said formers.

By the arrangement of the formers on the ends of their shafts $c$ said formers are exposed, so that any defect in their operation can be readily seen.

If desired, one of the rolls $a$ may have a plain surface without a cavity, as shown in Fig. 15.

Figure 10:
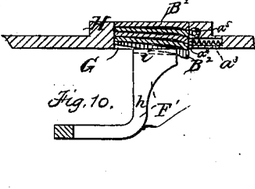
Figure 10A:
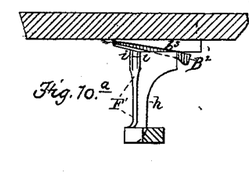

The inclination of the lowermost blanks in the dies G G', before alluded to, causes the blank from each die to enter the forwarder-jaws $i$ $i$ in an inclined position, as shown in Fig. 10, which represents a section of the die-block taken through one of the dies, with the jaws $i$ $i$ elevated to grasp the lower blank as it is pressed down by the punch. The jaws $i$ $i$ therefore grasp the blank only at a point near its head, the shank being so inclined that the greater portion of it projects above the jaws $i$ $i$, as shown in Figs. 10 and 10ª.

Figure 10B:
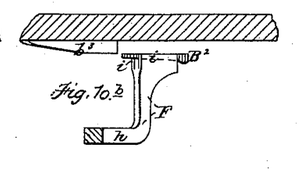

To force the shank down into the jaws and give the blank a level position, I provide two inclines, $b^3$ $b^3$, one for each forwarder F'. These inclines are rigidly attached to the under side of the horizontal portion of the frame A, that supports the die-block in the positions relatively to the dies shown in dotted lines in Fig. 3. The inclines $b^3$ $b^3$ are formed and arranged to strike the inclined shanks of the blanks during the horizontal movement of the forwarders F' F', as shown in Fig. 10ª, and force the shanks down to a level position, as shown in Fig. 10ᵇ, while the forwarders are passing said inclines.

I prefer to interpose a plate, $a^4$, between the spring $a^3$ and the heads of the blanks in the dies G G', said plate being pivoted to the die-block at $a^5$, so that it can properly bear against the ends of the blanks.

The machine described and shown constitutes, as a whole, five machines in one—that is to say, it does the work that five separate machines have heretofore been required to do, the following groups or elements each constituting one of said machines: First, the feeding and punching mechanism; second, one series of rolls, $a$ $a$; third, one of the clipping devices; fourth, the other series of rolls; and fifth, the other clipping device. These elements are connected and caused to form parts of a single organized machine by the distributing-forwarders F' F' and the succeeding forwarders.

The shoe K of the feeding mechanism, interposed between the cam S and the nail-plate which rests on the bed J, receives the pressure of the cam and prevents the latter from displacing or moving the plate longitudinally when it is rotated to clamp the plate. If the cam were allowed to come directly in contact with the plate it would have a tendency to move the plate, particularly when the latter is nearly consumed, and is therefore so light as to be easily displaced.

I claim—

1. In a horseshoe-nail machine, the combination of punching mechanism, consisting of a reciprocating punch and a stationary die adapted to hold one or more blanks, with a forwarder having yielding jaws, and mechanism, substantially as described, whereby said forwarder is presented to the die, held to receive a blank when the latter is ejected from the die, and then moved to present the blank properly to a succeeding device, as set forth.

2. The combination of punching mechanism, a forwarder having grasping-jaws, means, substantially as described, whereby the forwarder is held to receive a blank emerging from the punching mechanism and then moved to carry the blank forward, and a former arranged and operated to grasp the blank and remove it from the forwarder, as set forth.

3. In a horseshoe-nail machine, the combination of a former consisting of a pair of rotating or vibrating rolls, $a\ a$, a forwarder having grasping-jaws, and mechanism, substantially as described, whereby said forwarder is presented to a preceding device held to receive a blank from such device, and moved to present the head of the blank properly to the rolls $a\ a$, as set forth.

4. The combination of two formers, an intermediate forwarder having grasping-jaws, and mechanism, substantially as described, whereby said forwarder is held to receive a blank emerging from one former and moved to present said blank to the succeeding former, as set forth.

5. In an organized machine for making cold-rolled horseshoe-nails employing as elements a series of devices consisting of punching mechanism to separate a blank from a plate and formers to successively roll the blank, the combination, with said devices, of a series of intermediate forwarders having grasping-jaws, and mechanism, substantially as described, whereby said forwarders are held to receive the blanks and moved to present the same properly to the succeeding devices, as set forth.

6. The combination of duplicate punching mechanism arranged to cut two blanks simultaneously from a plate, two forwarders having grasping-jaws, means, substantially as described, whereby said forwarders are held to receive two blanks emerging from the punching mechanism and to carry forward and distribute said blanks, and two formers arranged to grasp the two blanks simultaneously and remove them from the forwarders, as set forth.

7. The combination of a former consisting of a pair of rolls, $a\ a$, adapted to perform a part of the operation of forming a nail, a forwarder adapted to receive a blank from a preceding device and to present the blank to the former, and means, substantially as described, for imparting a yielding pressure to the forwarder, whereby said forwarder is enabled to yield when its blank comes in contact with the rolls $a\ a$, as set forth.

8. The combination, substantially as set forth, of the following elements, to wit: first, a gang of formers operating in unison to form and move forward two or more nail-blanks; secondly, a gang of forwarders operating in unison to receive the nail-blanks emerging from the formers and move said blanks forward; and, thirdly, means, substantially as described, for imparting a yielding pressure to said forwarders, whereby the alignment of the heads of the blanks and their simultaneous forward movement are insured.

9. In a horseshoe-nail machine, a pair of journaled rolls, $a\ a$, having coincident cavities or dies $b\ b$, and mechanism, substantially as described, to oscillate or vibrate said rolls and bring them to a point of rest at the moment when the dies are properly opened, whereby the dies are momentarily held to receive the blank before moving to roll the same, combined with a forwarder having grasping-jaws, and mechanism, substantially as described, whereby said forwarder is presented to a preceding device held to receive a blank from such device and moved to present the blank to the dies $b\ b$, as set forth.

10. In a horseshoe-nail machine, one or more series of formers to form a nail or nails by successive operations, and one or more series of forwarders to move the blank or blanks between the formers, all so arranged as to expose the nail blank or blanks to view, as set forth.

11. In combination with the punching mechanism and the formers, the forwarders $F'\ F'$, the rotary spindles $j\ j$, supporting said forwarders, and means, substantially as described, whereby said spindles are intermittently rotated and raised and lowered, as set forth.

12. The forwarder, having separable spring-jaws, and the means, substantially as described, for equalizing the movements of said jaws, as and for the purpose specified.

13. In combination with the bed J, supporting the nail-plate, and the cam S, journaled in ears on said bed, the shoe K, pivoted to the bed, and adapted to be pressed by the cam against the nail-plate, as set forth.

14. The combination of the clipping mechanism, consisting of the reciprocating punch or shear and stationary bed-die, a forwarder, $F^3$, adapted to move forward and present a blank to the clipping mechanism, and the false jaws $i'$, pivoted to the bed-die and forming a stop to limit the end movement of a blank presented to the clipping mechanism by the forwarder, as set forth.

In testimony whereof I have signed my name to this specification in the presence of two subscribing witnesses this 22d day of September, 1879.

LYMAN W. WHIPPLE.

Witnesses:
C. F. BROWN,
GEO. WILLIS PIERCE.